(12) United States Patent
Sawarkar et al.

(10) Patent No.: US 12,456,213 B2
(45) Date of Patent: Oct. 28, 2025

(54) GENERATING VIEWS OF SKIN LESIONS FOR IMPROVED REMOTE EVALUATION

(71) Applicant: KONINKLIJKE PHILIPS N.V., Eindhoven (NL)

(72) Inventors: Abhivyakti Sawarkar, Cambridge, MA (US); Ayushi Sinha, Cambridge, MA (US)

(73) Assignee: Koninklijke Philips N.V., Eindhoven (NL)

( * ) Notice: Subject to any disclaimer, the term of this patent is extended or adjusted under 35 U.S.C. 154(b) by 246 days.

(21) Appl. No.: 18/203,922

(22) Filed: May 31, 2023

(65) Prior Publication Data
US 2023/0410339 A1    Dec. 21, 2023

Related U.S. Application Data

(60) Provisional application No. 63/351,571, filed on Jun. 13, 2022.

(51) Int. Cl.
*G06T 7/55* (2017.01)
*G06T 17/00* (2006.01)
*H04N 23/60* (2023.01)

(52) U.S. Cl.
CPC ...... *G06T 7/55* (2017.01); *G06T 2207/20081* (2013.01); *G06T 2207/30096* (2013.01)

(58) Field of Classification Search
None
See application file for complete search history.

(56) References Cited

U.S. PATENT DOCUMENTS

| | | |
|---|---|---|
| 2014/0313303 A1 | 10/2014 | Davis |
| 2020/0226816 A1 | 7/2020 | Kar |
| 2020/0234444 A1 | 7/2020 | Budman |
| 2022/0005191 A1 | 1/2022 | Connor |
| 2022/0036050 A1 | 2/2022 | Chandler |
| 2022/0036602 A1 | 2/2022 | Duckworth |
| 2022/0047165 A1 | 2/2022 | Perkins |

(Continued)

FOREIGN PATENT DOCUMENTS

CN    113706714 A1    11/2021

OTHER PUBLICATIONS

Jo, K. et al., "CG-NeRF: Conditional Generative Neural Radiance Fields". Association for the Advancement of Artificial Intelligence (2022).

(Continued)

*Primary Examiner* — Christopher Braniff (57) ABSTRACT

A method for generating a continuous digital volumetric representation of a region of a patient, comprising: (i) receiving, by a volumetric representation generation system, an instruction or request to generate a digital volumetric representation of the region of the patient; (ii) providing one or more guidance instructions regarding obtaining a plurality of images of the region; (iii) receiving the plurality of images, wherein at least of each of two or more of the plurality of images are obtained of the region of the patient from a different angle; (iv) processing, using a trained model, the received plurality of images to generate a continuous digital volumetric representation of the region; and (v) providing the generated continuous digital volumetric representation of the region to a user.

15 Claims, 5 Drawing Sheets

(56) References Cited

U.S. PATENT DOCUMENTS

2022/0157450 A1     5/2022    Kozloski
2022/0351465 A1*   11/2022   Pantpratinidhi .......... G06T 7/73

OTHER PUBLICATIONS

Lin, C-H et al., "BARF: Bundle-Adjusting Neural Radiance Fields". arXiv:2104.06405 [cs.CV].

Mildenhall, B. et al., "NeRF: Representing Scenes as Neural Radiance Fields for View Synthesis". arXiv:2003.08934 [cs.CV].

Yu, A. et al., "pixelNeRF: Neural Radiance Fields from One or Few Images." Proc. CVPR. May 30, 2021 [cited Sep. 16, 2021]; Available from: http://arxiv.org/abs/2012.02190.

Chuchu, N. et al., "Smartphone applications for triaging adults with skin lesions that are suspicious for melanoma". Cochrane Database Syst Rev. Dec. 4, 2018:12:CD013192. PMCID: PMC6517294.

Chao, E. et al., "Smartphone-Based Applications for Skin Monitoring and Melanoma Detection." Dermatol Clin. Oct. 2017;35(4):551-557. PMID: 28886812.

Phillips, M. et al., "Assessment of Accuracy of an Artificial Intelligence Algorithm to Detect Melanoma in Images of Skin Lesions." JAMA Netw Open. Oct. 2, 2019;2(10):e1913436. PMCID: PMC6806667.

Ngoo, AI. et al., "Efficacy of smartphone applications in high-risk pigmented lesions." Australas J Dermatol. Aug. 2018:59(3):e175-e182. PMID: 28240347.

Mar, V.J. et al., "Artificial intelligence for melanoma diagnosis: how can we deliver on the promise?" Ann Oncol. Aug. 1, 2018;29(8):1625-1628. PMID: 29846499.

Morley, J. et al., "The poor performance of apps assessing skin cancer risk." BMJ. Feb. 10, 2020;368:m428. PMID: 32048610.

Rat, C. et al., "Use of Smartphones for Early Detection of Melanoma: Systematic Review." J Med Internet Res. Apr. 13, 2018:20(4):e135. PMCID: PMC5923035.

International Search Report for PCT/EP2023/064853 filed Jun. 2, 2023.

Sun Shao-Hua et al., "Multi-view to Novel View: Synthesizing Novel Views with Self-learned Confidence", (Ocy. 7, 2018), European Conference on Computer Vision, p. 162-178.

\* cited by examiner

GENERATING VIEWS OF SKIN LESIONS FOR IMPROVED REMOTE EVALUATION

CROSS-REFERENCE TO RELATED APPLICATIONS

This patent application claims the priority benefit under 35 U.S.C. § 119(e) of U.S. Provisional Application No. 63/351,571, filed on Jun. 13, 2022, the contents of which are herein incorporated by reference.

BACKGROUND OF THE INVENTION

1. Field of the Invention

The present disclosure is directed generally to methods and systems for generating a digital volumetric representation of a region of a patient using a volumetric representation generation system.

2. Description of the Related Art

Remote patient assessment based on photographs and videos is becoming increasingly common. For example, dermatology encounters can occur in person at clinics or electronically through real-time or asynchronous tele-dermatology. Dermatology requires reliable point of care image acquisition and risk assessment, and imaging in dermatology is becoming mainstream with of-the-shelf phones and tablets or sometimes DSLR cameras for 2D or 3D total body photography. This includes patients with suspicious or cancerous lesions that require predictive support and tracking. 3D topology images are sometimes used based on the case.

However, the photographs and videos obtained remotely, such as by the patient themselves, are often of poor quality and marred with many challenges, which can be compounded by choice of algorithm, its predictive power, and uncertain results from unknown or inaccurate camera poses. Many challenges also result from patient inexperience in acquiring images from optimal views, preventing physicians/users from seeing views that would allow them to make accurate assessments.

Thus, with an increase in reliance on telemedicine for accurate initial diagnosis and disease progression tracking, there is a greater need for accurate assessment using patient or other non-expert acquired images. There is also a greater possibility of getting reliable skin lesion images with the advent of computer vision and progressively evolving algorithms. While there exist off the shelf smartphone and tablet-based apps that perform algorithm-based skin lesion risk assessment, their outputs are not diagnostic and are marred with reliability issues.

SUMMARY OF THE INVENTION

Accordingly, there is a continued need for methods and systems for improved visualization and analysis of patient imaging.

The present disclosure is directed to inventive methods and systems for visualization of a region of a patient, such as a skin surface or other region. Various embodiments and implementations herein are directed to a volumetric representation generation system configured to generate a continuous volumetric representation of the region of the patient. The system receives an instruction or request to generate a digital volumetric representation of the region of the patient, and provides, via a user interface, one or more guidance instructions regarding obtaining a plurality of images of the region of the patient. The system receives the plurality of images obtained of the region of the patient, where at least of each of two or more of the plurality of images are obtained from different angles. A trained model of the system processes the received images in order to generate a continuous digital volumetric representation of the region, which is provided to a user, such as a medical professional/user. The medical professional/user can be anyone in the medical field, including but not limited to caregivers, physicians, nurses, technicians, IT, and/or any other users or individuals in or otherwise related to the medical field.

Generally in one aspect, a method for generating a continuous digital volumetric representation of a region of a patient is presented. The method includes: (i) receiving, by a volumetric representation generation system, an instruction or request to generate a digital volumetric representation of the region of the patient; (ii) providing, to the patient via a user interface, one or more guidance instructions regarding obtaining a plurality of images of the region of the patient; (iii) receiving a plurality of images obtained of the region of the patient, wherein at least of each of two or more of the plurality of images are obtained of the region of the patient from a different angle; (iv) processing, using a trained model, the received plurality of images to generate a continuous digital volumetric representation of the region; and (v) providing the generated continuous digital volumetric representation of the region to a user.

According to an embodiment, the trained model is further configured to generate, by processing the received plurality of images, a confidence level for the generated continuous digital volumetric representation of the region.

According to an embodiment, the method further comprises: providing, to the patient via the user interface, an instruction to obtain one or more images of the region of the patient, wherein the instruction is based on the generated continuous digital volumetric representation of the region; receiving one or more images of the region of the patient; and re-processing, using the trained model, the received plurality of images and the received one or more images to generate an updated continuous digital volumetric representation of the region.

According to an embodiment, the plurality of images obtained of the region of the patient are obtained using a digital camera. According to an embodiment, the digital camera is a component of a wearable device or a smartphone of the patient.

According to an embodiment, the confidence level comprises a variety of colors or numbers.

According to an embodiment, the method further includes processing two or more generated continuous digital volumetric representations of the region, the two or more generated continuous digital volumetric representations of the region generated from a plurality of images of the region of the patient obtained at different times.

According to an embodiment, the method further comprises training the model to process a received plurality of images of a region to generate at least a continuous digital volumetric representation of the region.

According to another aspect is a method for manipulating a continuous digital volumetric representation of a region of a patient. The method includes: (i) receiving a generated continuous digital volumetric representation of a region of a patient, and (ii) manipulating, using a visualization controller and user interface, the received continuous digital volumetric representation, wherein manipulation comprises at least viewing the received continuous digital volumetric representation from two or more different angles. The continuous digital volumetric representation of the region of the patient is generated by the process: receiving, by the system, an instruction or request to generate a digital volumetric representation of the region of the patient; providing, to the patient via a user interface, one or more guidance instructions regarding obtaining a plurality of images of the region of the patient; receiving a plurality of images obtained of the region of the patient, wherein at least of each of two or more of the plurality of images are obtained of the region of the patient from a different angle; processing, using a trained model, the received plurality of images to generate the continuous digital volumetric representation of the region.

According to another aspect is a system for generating a continuous digital volumetric representation of a region of a patient. The system includes: a plurality of images obtained of a region of a patient, wherein at least of each of two or more of the plurality of images are obtained of the region of the patient from a different angle; a trained volumetric representation model; a processor configured to process, using the trained volumetric representation model, the received plurality of images to generate a continuous digital volumetric representation of the region; and a user interface configured to provide the generated continuous digital volumetric representation of the region to a user.

According to an embodiment, the processor is further configured to receive an instruction or request to generate a digital volumetric representation of the region of the patient, and wherein the user interface is further configured to provide one or more guidance instructions regarding obtaining a plurality of images of the region of the patient.

According to an embodiment, the processor is further configured to: (i) provide an instruction to obtain one or more images of the region of the patient, wherein the instruction is based on the generated continuous digital volumetric representation of the region; (ii) receive one or more images of the region of the patient; and (iii) re-process, using the trained volumetric representation model, the received plurality of images and the received one or more images to generate an updated continuous digital volumetric representation of the region.

According to an embodiment, the processor is further configured to train the volumetric representation model to process a received plurality of images of a region to generate at least a continuous digital volumetric representation of the region.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EXEMPLARY EMBODIMENTS

The present disclosure describes various embodiments of continuous digital volumetric representation system and method. More generally, Applicant has recognized and appreciated that it would be beneficial to provide a system that generates and provides improved imaging of a remote patient. For example, a volumetric representation generation system receives an instruction or request to generate a digital volumetric representation of the region of the patient, and provides, via a user interface, one or more guidance instructions regarding obtaining a plurality of images of the region of the patient. The system receives the plurality of images obtained of the region of the patient, where at least of each of two or more of the plurality of images are obtained from different angles. A trained model of the system processes the received images in order to generate a continuous digital volumetric representation of the region, which is provided to a user such as a medical professional.

According to an embodiment, therefore, is a workflow, algorithm, associated patient user interface, and associated user interface, aimed at facilitating improved imagery of a patient condition. One example where the invention may be useful is to assist in imaging skin conditions. The method and systems utilizes a deep learning based system that can utilize a few images of a skin condition acquired on a phone or tablet or other imaging device and learn a continuous volumetric representation of the condition. This system described in detail below leverages methods like neural radiance fields (e.g., "NeRF" and its variants) to extend telemedicine to the field of dermatology and improve remote skin lesion risk assessment. This enables the synthesis of new views of the lesion, allowing physicians or other users to make informed diagnoses and to work toward better diagnostic certainty. While the examples provided herein focus on skin conditions, the methods and systems described or otherwise envisioned herein are equally as applicable to any application that requires the acquisition of images of a target area of a patient. The methods and systems described or otherwise envisioned herein may be implemented, for example, as a software feature (e.g., mobile application) or a device (e.g., tablet dedicated to patient monitoring) that has access to images acquired from a camera.

According to an embodiment, the methods and systems described or otherwise envisioned herein utilize one or more algorithms to learn continuous volumetric scene functions which allow the synthesis of novel views of skin conditions from various angles in order to facilitate remote assessment of skin conditions and prediction of associated risks such as likelihood of malignancy of the lesion. NeRF and its variants are popular methods leveraging computer vision and deep learning to synthesize photorealistic novel views of real-world scenes. While the implementation of NeRF requires accurate camera poses to learn scene representations, some if its variants like bundle-adjusting neural radiance fields ("BARF") can be trained with imperfect camera poses. BARF presents techniques that can learn continuous volumetric scene representations while also registering camera frames, enabling view synthesis and localization of video sequences from imperfect camera poses. In addition, variants such as pixelNeRF present methods to generalize across scenes from a particular class (e.g., the class of all skin lesions or the class of all skin rashes).

The volumetric representation generation systems and methods disclosed or otherwise envisioned herein provide numerous advantages over the prior art. For example, by synthesizing accurate new views using NeRF and/or its variants, users such as physicians are less reliant on patient choice of view angle(s). Some variants can synthesize accurate new views even when estimated camera angles are inaccurate, while other variants can synthesize views from only one or two views, allowing users such as physicians to view the skin conditions from their desired angles. This allows users such as physicians to make informed diagnoses early, work toward improved diagnostic certainty and, therefore, present triage, specialist reference, further investigations, preventative, and/or treatment options to their remote patients.

Figure 1:
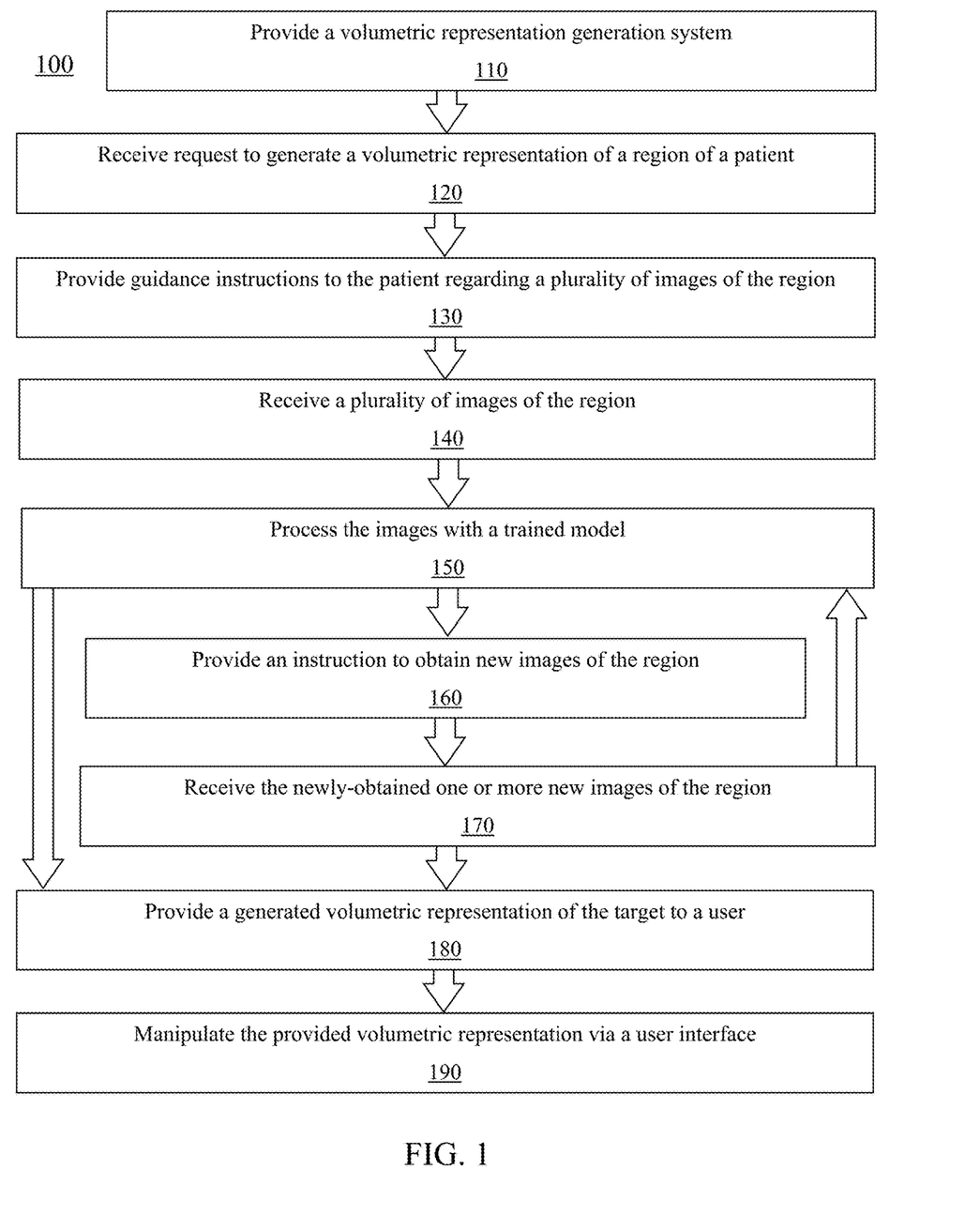
FIG. 1 is a flowchart of a method for generating a continuous digital volumetric representation of a patient, in accordance with an embodiment.

Referring to FIG. 1, in one embodiment, is a flowchart of a method 100 for generating a continuous digital volumetric representation of a region of a patient using a volumetric representation generation system. The methods described in connection with the figures are provided as examples only, and shall be understood not to limit the scope of the disclosure. The volumetric representation generation system can be any of the systems described or otherwise envisioned herein. The volumetric representation generation system can be a single system or multiple different systems.

Figure 2:
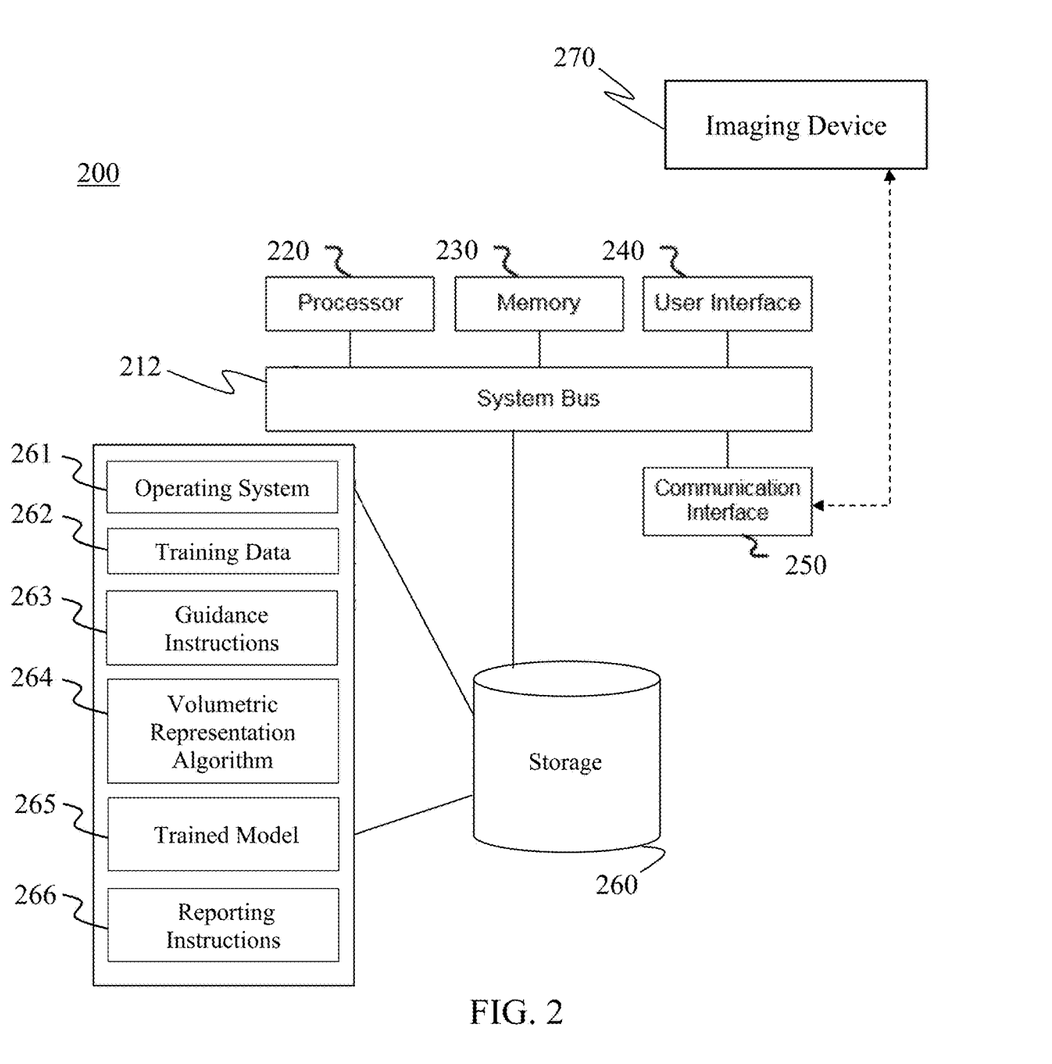
FIG. 2 is a schematic representation of a volumetric representation generation system, in accordance with an embodiment.

At step 110 of the method, a volumetric representation generation system 200 is provided. Referring to an embodiment of system 200 as depicted in FIG. 2, for example, the system comprises one or more of a processor 220, memory 230, user interface 240, communications interface 250, storage 260, and imaging device 270, interconnected via one or more system buses 212. It will be understood that FIG. 2 constitutes, in some respects, an abstraction and that the actual organization of the components of the system 200 may be different and more complex than illustrated. Additionally, volumetric representation generation system 200 can be any of the systems described or otherwise envisioned herein. Other elements and components of system 200 are disclosed and/or envisioned elsewhere herein.

At step 120 of the method, the volumetric representation generation system receives an instruction or request to generate a digital volumetric representation of the region of the patient. The instruction or request can be received from any individual, including from the patient, a user of the system such as a medical professional, an insurance company representative, or any other individual or source. The instruction or request can be received locally or remotely. For example, the instruction or request can be received by the volumetric representation generation system from a medical professional at a remote location, such as through a wired and/or wireless network, including the internet. A medical professional may request imaging, such as in response to an inquiry or concern from a patient, and thus send a request to the volumetric representation generation system to generate a digital volumetric representation of the region of the patient, which the medical professional will later view and analyze. The region of the patient can be any region that is capable of being imaged. For example, the region can be an outer surface of the patient, such as a skin surface or other outer surface, or the region can be an inner surface of the patient, such as the mouth, ear, or other orifice. Many other options are possible.

According to one non-limiting example, a patient notices a lesion or other potential skin condition on a surface of their body, and wants to send imaging to their medical professional for analysis. Accordingly, the patient interacts with the volumetric representation generation system, such as through a user interface like an application on a computer or smartphone. The system may allow the patient to select an option for imaging, including a selected region of the body. For example, the system may allow the patient to select an option to image their right upper forearm, where the skin condition is located. The user may select a region of interest by entering text, selecting or clicking on a target, or otherwise identifying or selecting a region. Thus, a user interface may include one or more devices for enabling communication with a user. The user interface can be any device or system that allows information to be conveyed and/or received, and may include a display, a mouse, and/or a keyboard for receiving user commands.

At step 130 of the method, the volumetric representation generation system provides one or more guidance instructions to the patient in response to the instruction or request to generate a digital volumetric representation of the region. The guidance instructions provide guidance to the patient about obtaining a plurality of images of the region of the patient, and are based on the received instruction or request. The instructions can include information specific to the patient, the identified region of the patient, the device with which the images will be obtained, and/or a wide variety of other variables. The guidance instructions can comprise instructions on how to obtain a plurality of images of the region of the patient, including how many images to obtain, from which angles the images should be obtained, how far away from the region the camera should be positioned, lighting information, and/or a wide variety of other information.

The guidance instructions can be provided to the patient via a user interface of the volumetric representation generation system. The guidance instructions can be provided to the patient via text, via icons and imagery, via sound, and/or via a variety of other mechanisms. Thus, a user interface may include one or more devices for enabling communication with a user. The user interface can be any device or system that allows information to be conveyed and/or received, and may include a display, a mouse, and/or a keyboard for receiving user commands.

According to an embodiment, the volumetric representation generation system may comprise or be in communication with an app on a smartphone, tablet, wearable device, or other image-capturing patient device that can guide the patient to acquire images of the region in a predetermined pattern. For example, the app may depict arrows on a screen to indicate a direction of motion and/or show circles to align with in order to indicate the pose at which to acquire images, among many other possible embodiments.

Figure 4:
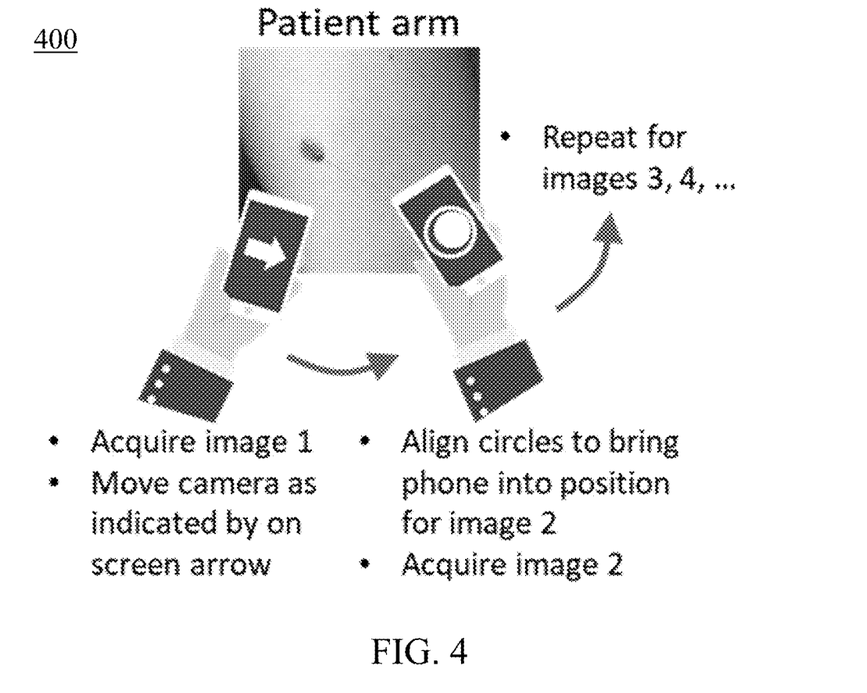
FIG. 4 is a schematic representation of a computer app guiding a patient to acquire images of a target, in accordance with an embodiment.

Referring to FIG. 4, in one embodiment, is a schematic representation 400 of a computer app guiding a patient to acquire images of a skin lesion or other target in a known pattern. The images are sent to the trained neural network that can refine the estimated camera poses and synthesize novel views of the target.

At step 140 of the method, the volumetric representation generation system receives a plurality of images obtained by the patient of the region. According to an embodiment, the plurality of images comprise images from two or more different angles, distances, views, and/or other variations of the image. According to an embodiment, the plurality of images are obtained by the patient as guided by the guidance instructions provided to the patient.

The images can be obtained by the patient using any device with a camera capable of capturing images of a region of the patient. For example, the device may be a digital camera, a smartphone, a wearable device, a tablet, a webcam, and/or any other device with digital camera capabilities.

The captured images may be utilized by the capturing device for downstream steps of the method. Alternatively, the captured plurality of images may be transmitted, communicated or otherwise transferred to a separate local or remote component of the volumetric representation generation system for analysis. The captured plurality of images may be transmitted by wired and/or wireless communication from the imaging device to a local or remote computer, server, processor, or other component of the volumetric representation generation system. For example, the captured plurality of images may be obtained using a smartphone, wearable device, tablet, webcam, or other imaging device, and can be transferred from memory or storage of that device to a computer or server via wired and/or wireless communication, such as through a storage device, the internet, a local network, and/or any other communication network or method.

The captured or received images can be utilized immediately, and/or can be stored in local or remote storage for downstream use.

At step 150 of the method, the volumetric representation generation system processes the received plurality of images. According to an embodiment, a trained model of the volumetric representation generation system processes two or more of the received plurality of images. According to an embodiment, the processing includes fine-tuning the trained model with the two or more of the received plurality of images. The trained model may utilize every image in the received plurality of images, or only some of the images in the received plurality of images. For example, the system may be configured, designed, or otherwise programmed to select a subset of the plurality of images (which may be all of the images or less than all of the images) by filtering out images that do not meet a predetermined criteria, including not having the region of the patient in the field of view, being blurry, lacking sufficient detail or clarity, or any of a wide variety of other criteria.

The trained model of the volumetric representation generation system generates, using the plurality of received images as input, a continuous digital volumetric representation of the region. The trained model of the volumetric representation generation system also optionally generates, using the plurality of received images as input, a confidence level for the generated continuous digital volumetric representation of the region.

According to an embodiment, the trained model of the volumetric representation generation system receives as input the plurality of received images, and refines the estimated camera poses from the app—assuming according to one embodiment that the patient-acquired images are close to the desired angles because the patient followed the app directions but with some errors—and generates a continuous volumetric representation of the target region.

According to an embodiment, the trained model of the volumetric representation generation system generates a continuous volumetric representation of the target region and a confidence associated with the continuous volumetric representation of the target region. Accordingly, the model may output a confidence associated with the generated volumetric representation of the lesion based on differences or errors between images acquired by the patient and images estimated by rendering views through the volumetric representation from the optimized camera poses associated with the images. According to an embodiment, low errors may indicate high confidence. Confidence may be estimated by running an inference phase controller multiple times and rendering views from the same camera poses multiple times. Due to the use of dropout layers, the inferred volumetric representation may differ slightly with each run. Low variance across runs indicates consistent estimations and can be associated with high confidence. Confidence will also be higher close to the angles of image acquisition since information about the 3D scene from views further away from angles of acquisition will be sparse leading to blurry renderings.

According to an embodiment, the processing includes training the model of the volumetric representation generation system with two or more of the received plurality of images, as described or otherwise envisioned herein. The algorithm of the volumetric representation generation system can be any machine learning algorithm, neural network, or other algorithm capable of utilizing the described input to generate the described output, thereby training the model. The algorithm of the volumetric representation generation system generates, using the plurality of received images as input, a continuous digital volumetric representation of the region. The algorithm of the volumetric representation generation system also generates, using the plurality of received images as input, a confidence level for the generated continuous digital volumetric representation of the region.

Figure 3:
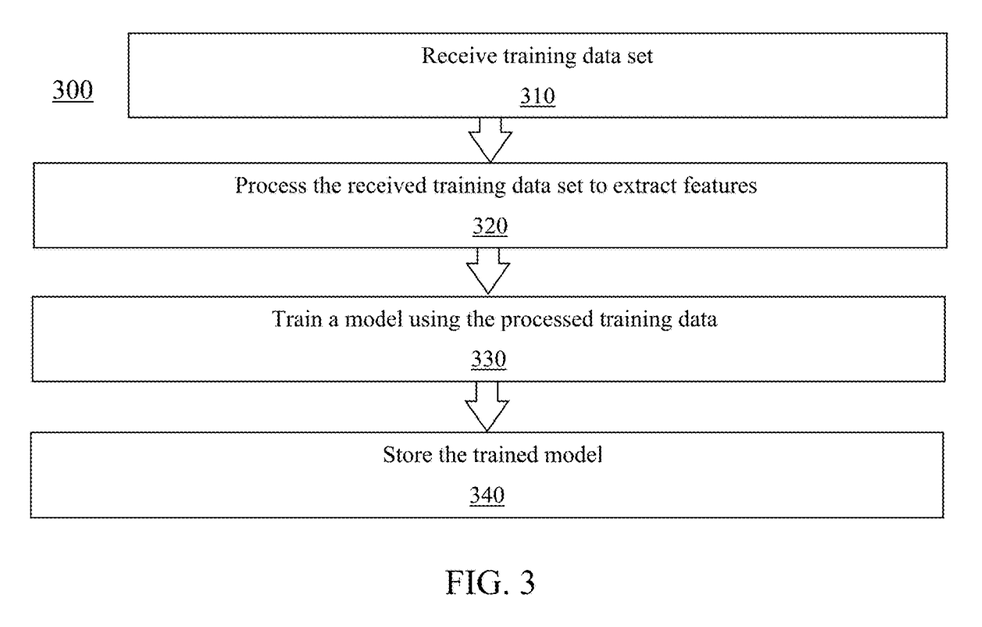
FIG. 3 is a flowchart of a method for training a volumetric representation model, in accordance with an embodiment.

Referring to FIG. 3, in one embodiment, is a flowchart of a method 300 for training the trained model of the volumetric representation generation system. At step 310 of the method, the system receives a training data set comprising a plurality of images from a target region obtained from a single patient. In another embodiment, the system receives a training data set comprising a plurality of images for each of a plurality of different target regions, obtained from a plurality of patients. For example, the training data set may comprise a plurality of images for each of a plurality of different types and/or locations of skin conditions such as skin lesions. The training data can comprise any information or data necessary to train the model of the volumetric representation generation system. The training data may be stored in and/or received from one or more databases. The database may be a local and/or remote database. For example, the volumetric representation generation system may comprise a database of training data.

According to an embodiment, the volumetric representation generation system may comprise a data pre-processor or similar component or algorithm configured to process the received training data. For example, the data pre-processor analyzes the training data to remove noise, bias, errors, and other potential issues. The data pre-processor may also analyze the input data to remove low quality data. Many other forms of data pre-processing or data point identification and/or extraction are possible.

At step 320 of the method, the system processes the received information to extract features about the training data. The extracted features may be any features which will be utilized to train the model, such as any features that can or will be utilized by the algorithm for processing of a current or future target region imaged by a patient. Feature extraction can be accomplished by a variety of embodiments for feature identification, extraction, and/or processing, including any method for extracting features from a dataset. The outcome of a feature processing step or module of the volumetric representation generation system is a set of features about a plurality of imaged target regions for a plurality of patients, which thus comprises a training data set that can be utilized to train the model of the volumetric representation generation system.

At step 330 of the method, the system trains the model, which will be the model utilized in processing patient images as described or otherwise envisioned. The model may be trained using a machine learning algorithm. The model is trained using the extracted features according to known methods for training a model. According to an embodiment, the model is trained, using the processed training dataset, to generate a continuous digital volumetric representation of an imaged region, and a confidence level for the generated continuous digital volumetric representation of the region, using a plurality of images of the target region as input. According to another embodiment, the model is trained directly on the input images and features are extracted as part of the training, as in neural networks. The model may be trained per patient or per lesion to generate a continuous digital volumetric representation specific to the lesion, or the model may be trained across several patients or lesions to generate a generalized continuous digital volumetric representation. The generated continuous digital volumetric representation can comprise any of the information described or otherwise envisioned herein.

At step 340 of the method, the trained model is stored for future use. According to an embodiment, the trained model may be stored in local or remote storage.

According to an embodiment, the algorithm of the volumetric representation generation system utilizes a plurality of images of a target region, such as those taken by an RGB camera on a smartphone, tablet, or similar device to generate one or more new views of the target region, in order to allow physicians/users to observe a remote patients' target region from a plurality of different desired viewing angles.

According to an embodiment, the training dataset comprises retrospective images of target regions, such as a skin lesion, acquired where each target region in the dataset comprises at least two different images. According to an embodiment, the training dataset may be obtained or processed using a processor that utilizes sensors on the imaging device, such as an accelerometer, gyroscope, or other sensor, and/or the system can utilize image processing methods like structure from motion (SfM), simultaneous localization and mapping (SLAM), and others in order to approximate camera poses for each image of the target region.

Figure 5:
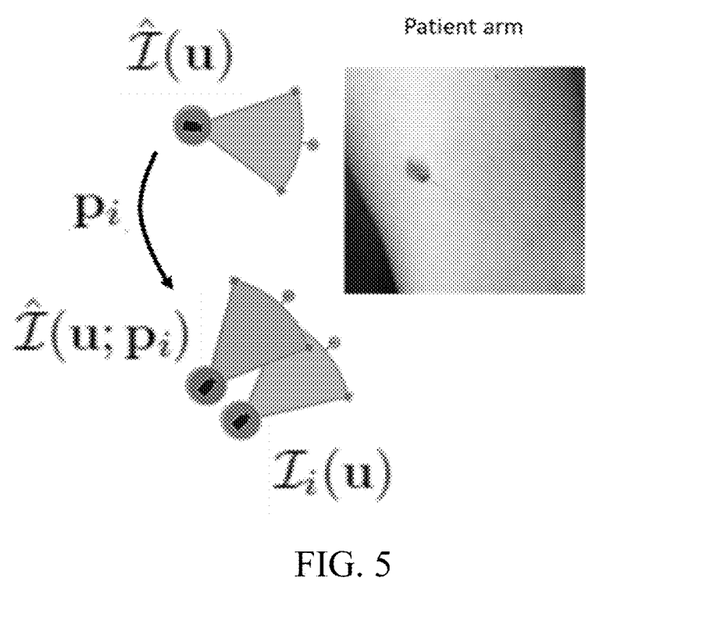
FIG. 5 is a schematic representation of an algorithm optimizing camera poses, in accordance with an embodiment.

During training, the machine learning algorithm receives the retrospective image data along with approximate camera poses associated with each image of a target region. The machine learning algorithm trains a model using the received data to learn the 3D or volumetric scene representation for each target region, as well as the optimal camera poses associated with each of the at least two images. Neural network based methods such as bundle-adjusting neural radiance fields not only learn a volumetric scene representation in order to synthesize new views from new camera angles, but also adjust the estimated camera poses associated with training images. This can be done in the training phase controller in a self-supervised way by minimizing the following loss function, using an algorithm such as bundle-adjusting neural radiance fields (BARF), with the following equation:

$$\min_{p_1,\ldots p_M,\Theta} \sum_{i=1}^{M} \sum_{u} \|\hat{I}(u; p_i, \Theta) - I_i(u)\|_2^2, \quad \text{(Eq. 1)}$$

where $p_i$ denotes the camera poses associated with each of M images (in the simplest example, M=2), $\Theta$ are the neural network parameters, $u \in \mathbb{R}^2$ are pixel coordinates, I denotes an input image, and $\hat{I}$ denotes an image estimated or synthesized by the neural network. This loss function minimizes the error between a given image (I) in the training dataset and another image in the dataset estimated by the neural network ($\hat{I}$) via ray casting through the learned volumetric representation and transformed by a relative camera transformation, p, between I and $\hat{I}$ (as shown in FIG. 5. Referring to FIG. 5, in one embodiment, is a schematic representation depicting how the bundle-adjusting neural radiance fields (BARF) algorithm optimizes camera poses within a neural radiance field estimation framework. For example, estimated image $\hat{I}$ transformed to the coordinate space of I is compared to the original image I in order to optimize pose in addition to estimating the 3D scene representation.

According to an embodiment, training data for a region comprises at least two images, while more than two images can lead to better scene representation learning and, therefore, better view synthesis. By additionally also conditioning the network on spatial image features from a particular category (e.g., in this instance, images of skin lesions although many other categories and regions of interest are possible) using a fully-convolutional image encoder, this network can be trained to generalize better with few (e.g., two) images of the scene.

According to an embodiment, the system can also learn to associate confidence with the trained neural network output, namely the generated continuous digital volumetric representation. For example, confidence can be associated with the output of the loss function or by adding dropout layers into the network architecture in order to measure consistency in network outputs when different nodes in the network are ignored.

Returning to method 100 depicted in FIG. 1, optional step 160 of the method may comprise providing, to the patient, via the user interface, an instruction to obtain one or more new images of the region of the patient. The instruction may be based on the generated continuous digital volumetric representation of the region, and may be necessary because one or more images of the target region and/or the generated continuous digital volumetric representation of the region is not of sufficient quality. This may be determined automatically by the system, or may be determined by a medical professional/user reviewing the one or more images of the target region and/or the generated continuous digital volumetric representation of the region. That is, the information flow between patient and system is such that the user may provide information, such as images, to the system and the system may provide instructions to the patient to acquire the images. The instruction may be an instruction to completely repeat the process of obtaining two or more images, the instruction may be an instruction to obtain one or more new images of the region, or the instruction may be another instruction configured to improve the one or more images of the target region and/or the generated continuous digital volumetric representation of the region.

At optional step 170 of the method, the volumetric representation generation system receives one or more new images of the region of the patient. According to an embodiment, the plurality of images are obtained by the patient as guided by the guidance instructions provided to the patient, and/or the instruction to obtain one or more new images of the region of the patient. The new images can be obtained by the patient using any device with a camera capable of capturing images of a region of the patient. For example, the device may be a digital camera, a smartphone, a wearable device, a tablet, a webcam, and/or any other device with digital camera capabilities. This device can be the same device used to obtain the initial images, or can be a different device.

The newly-captured images may be utilized by the capturing device for downstream steps of the method. Alternatively, the newly-captured plurality of images may be transmitted, communicated or otherwise transferred to a separate local or remote component of the volumetric representation generation system for processing. The newly-captured plurality of images may be transmitted by wired and/or wireless communication from the imaging device to a local or remote computer, server, processor, or other component of the volumetric representation generation system. For example, the newly-captured plurality of images may be obtained using a smartphone, wearable device, tablet, webcam, or other imaging device, and can be transferred from memory or storage of that device to a computer or server via wired and/or wireless communication, such as through a storage device, the internet, a local network, and/or any other communication network or method. The newly-captured or received images can be utilized immediately, and/or can be stored in local or remote storage for downstream use.

At step 150 of the method, the algorithm of the volumetric representation generation system processes the received plurality of images and/or the received newly-captured one or more images in order to generate an updated continuous digital volumetric representation of the region. According to an embodiment, the processing includes further fine-tuning the trained model with the newly-captured one or more images. According to an embodiment, the algorithm of the volumetric representation generation system also generates an updated confidence level for the generated updated continuous digital volumetric representation of the region.

At step 180 of the method, the generated continuous digital volumetric representation of the region, and optionally a generated confidence level, are provided via a user interface of the volumetric representation generation system. The generated continuous digital volumetric representation of the region may be provided to a user, which can be a medical professional, the patient, and/or any other individual authorized to see or review the information. The generated continuous digital volumetric representation of the region, and optionally a generated confidence level, can be provided to a viewer via any user interface or other information communication system. For example, the generated continuous digital volumetric representation of the region and/or any other information can be transmitted or otherwise communicated via wired and/or wireless communication to a local or remote viewer, such as a remote medical professional. For example, the generated continuous digital volumetric representation of the region and/or any other information can be generated or gathered by a patient device such as a smartphone, and can be communicated by the internet or another network to the patient's medical professional for analysis of the region of interest.

Accordingly, at optional step 190 of the method, a user manipulates the received continuous digital volumetric representation using a visualization controller and user interface. According to an embodiment, manipulation comprises at least viewing the received continuous digital volumetric representation from one or more different angles. For example, the information can be displayed on a screen, and can enable manipulation either directly or indirectly, via text entry, voice commands, mouse, touch, or other interface movements, clicking, or selecting, direct digital manipulation, or any other form of manipulation. The information provided via the user interface may further comprise information about the patient, about the region of interest, about the system itself, about medical history of the patient, about the exposure history of the patient, about the user such as a medical professional, and/or any other information.

Figure 6:
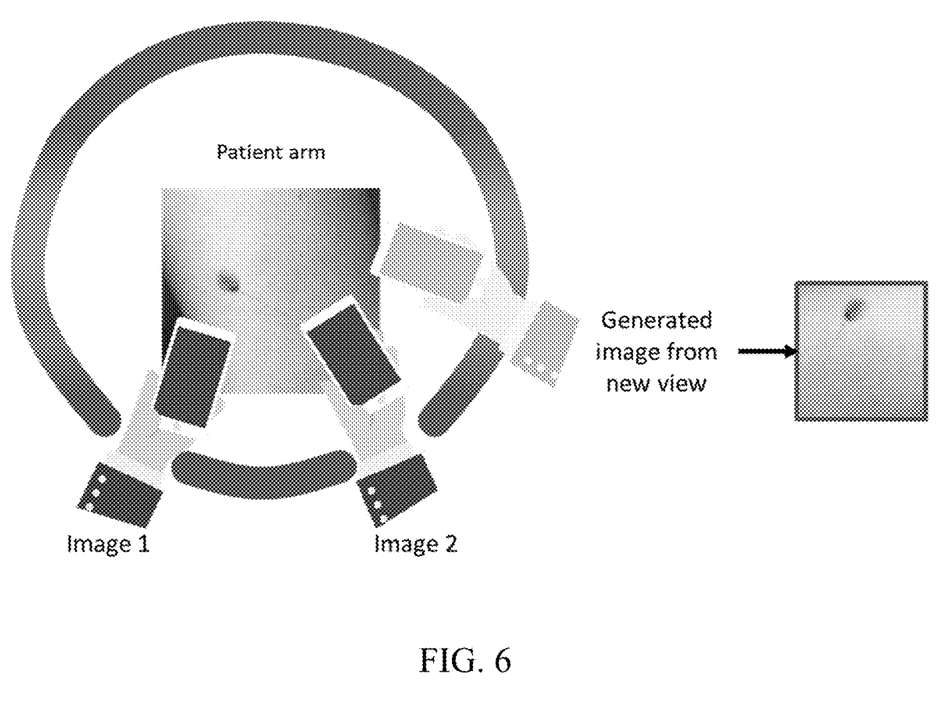
FIG. 6 is a schematic representation of a user interface of a volumetric representation generation system, in accordance with an embodiment.

According to an embodiment, a visualization controller allows the user to choose new viewing directions and renders novel views from the chosen directions. The user interface may display estimated confidence in view directions based on distance from acquired views. For example, referring to FIG. 6, is a schematic representation of an example UI component of the inference phase controller where confidence in view directions is shown from increasing to decreasing order by a color (such as green denoting highest confidence, yellow denoting medium confidence, and red denoting low confidence) or by another option such as numbers, a haptic indicator, a noise, or other confidence-communicating option. A synthetic view generated (shown by the smartphone) also has confidence associated with it based on variance from dropout as explained elsewhere herein. Confidence in the generated image computed using dropout can also be visualized by, for instance, coloring the image border green for high confidence, or displaying the variance value, among many other options.

According to one embodiment of the volumetric representation generation system, accurate camera poses associated with each acquired image can be assumed to be known. In this case, neural network training is simplified by removing the requirement to also optimize camera poses. The loss function described above is then simply as described in the following equation:

$$\min_{\Theta} \sum_{k_i} \left\| \hat{I}(u; \Theta) - I(u) \right\|_2^2, \qquad \text{(Eq. 2)}$$

where each input image is compared against its own estimation via ray casting through the learned volumetric scene representation.

According to another embodiment of the volumetric representation generation system, longitudinal image data from patients is available. In this case, methods can be used to weakly condition the network on patient specific (rather than category specific) spatial image features. The condition can allow the system to learn a generalized volumetric representation over time, therefore increasing the number of views available albeit over time. At a later time, an updated volumetric scene representation may be learned from a single new view since only a few aspects of the scene are expected to change (i.e., the lesion). The weak conditioning on the past is to allow the network to update its representation of the lesion while keeping other aspects same or similar.

According to yet another embodiment of the volumetric representation generation system, longitudinal data from patients is available and an additional controller, post-processing controller, takes the learned scene representation from views acquired at different times and automatically computes clinically relevant metrics like percent change in size of lesion, etc. allowing the physician/user to better compute associated risks. In another embodiment, the post-processing controller takes the learned scene representation from views acquired at different times and directly computes associated risks such as likelihood of malignancy of the lesion. Accordingly, the method can comprise, for example, processing two or more generated continuous digital volumetric representations of the region, the two or more generated continuous digital volumetric representations of the region generated from a plurality of images of the region of the patient obtained at different times. For example, a first plurality of images of the region can be obtained at a first time point, and a second plurality of images of the region can be obtained at a second time point after the first time point. The time difference between the two or more time points can be hours, days, months, years, or any variation thereof. The system can then generate digital volumetric representations of the region at the different time points, and can compute clinically relevant metrics such as percent change in size of lesion, among many other possible metrics and measurements.

According to another embodiment of the volumetric representation generation system, images are accompanied by labeled regions of interest (ROI). For instance, in the case where a patient acquires images of skin lesions on their imaging device, they may indicate the ROI by tapping on the screen at the location of the lesion. In this case, errors at the ROI may be weighted higher than other regions in neural network training in order to force the network to be more accurate where clinically relevant.

According to one embodiment of the volumetric representation generation system, the patient acquires videos of the lesion instead of images. Each frame of the video can be considered as an image with an associated camera pose. The primary embodiment or any of the alternative embodiments can also be applied to this data as described or envisioned herein.

Referring to FIG. 2, in one embodiment, is a schematic representation of a volumetric representation generation system 200. System 200 may be any of the systems described or otherwise envisioned herein, and may comprise any of the components described or otherwise envisioned herein. It will be understood that FIG. 2 constitutes, in some respects, an abstraction and that the actual organization of the components of the system 200 may be different and more complex than illustrated.

According to an embodiment, system 200 comprises a processor 220 capable of executing instructions stored in memory 230 or storage 260 or otherwise processing data to, for example, perform one or more steps of the method. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors. Memory 230 can take any suitable form, including a non-volatile memory and/or RAM. The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 200. It will be apparent that, in embodiments where the processor implements one or more of the functions described herein in hardware, the software described as corresponding to such functionality in other embodiments may be omitted.

User interface 240 may include one or more devices for enabling communication with a user, such as a patient and/or a medical professional. The user interface can be any device or system that allows information to be conveyed and/or received, and may include a display, a mouse, and/or a keyboard for receiving user commands. In some embodiments, user interface 240 may include a command line interface or graphical user interface that may be presented to a remote terminal via communication interface 250. The user interface may be located with one or more other components of the system, or may be located remote from the system and in communication via a wired and/or wireless communications network.

Communication interface 250 may include one or more devices for enabling communication with other hardware devices. For example, communication interface 250 may include a network interface card (NIC) configured to communicate according to the Ethernet protocol. Additionally, communication interface 250 may implement a TCP/IP stack for communication according to the TCP/IP protocols. Various alternative or additional hardware or configurations for communication interface 250 will be apparent.

Storage 260 may include one or more machine-readable storage media such as read-only memory (ROM), random-access memory (RAM), magnetic disk storage media, optical storage media, flash-memory devices, or similar storage media. In various embodiments, storage 260 may store instructions for execution by processor 220 or data upon which processor 220 may operate. For example, storage 260 may store an operating system 261 for controlling various operations of system 200.

It will be apparent that various information described as stored in storage 260 may be additionally or alternatively stored in memory 230. In this respect, memory 230 may also be considered to constitute a storage device and storage 260 may be considered a memory. Various other arrangements will be apparent. Further, memory 230 and storage 260 may both be considered to be non-transitory machine-readable media. As used herein, the term non-transitory will be understood to exclude transitory signals but to include all forms of storage, including both volatile and non-volatile memories.

While system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, where one or more components of system 200 is implemented in a cloud computing system, the various hardware components may belong to separate physical systems. For example, processor 220 may include a first processor in a first server and a second processor in a second server. Many other variations and configurations are possible.

According to an embodiment, storage 260 of system 200 may store one or more algorithms, modules, and/or instructions to carry out one or more functions or steps of the methods described or otherwise envisioned herein. For example, the system may comprise, among other instructions or data, an operating system 261 for controlling various operations of system 200, a training dataset 262, guidance instructions 263, a volumetric representation learning algorithm 264, a trained model 265, and/or reporting instructions 266.

According to an embodiment, training dataset 262 is training data utilized to train the volumetric representation model 265. The training dataset may be any data suitable to train, using the volumetric representation learning algorithm 264, the volumetric representation model 265 to utilize the described input and generate the described output. For example, training dataset 262 may comprise a plurality of images for a target region obtained from a patient. For example, training dataset 262 may comprise a plurality of images for a target region obtained from a patient over time. For example, training dataset 262 may comprise a plurality of images for each of a plurality of different target regions, obtained from a plurality of patients. For example, the training data set may comprise a plurality of images for each of a plurality of different types and/or locations of skin conditions such as skin lesions. The training data can comprise any information or data necessary to train the model of the volumetric representation generation system. The training data may be stored in and/or received from one or more databases. The database may be a local and/or remote database. For example, the volumetric representation generation system may comprise a database of training data. The training dataset 262 may be periodically updated, and thus the volumetric representation model 265 may be retrained or otherwise updated.

According to an embodiment, guidance instructions 263 direct the system to provide to the patient via the user interface 240, one or more guidance instructions regarding obtaining a plurality of images of the region of the patient. The guidance instructions can be provided to the patient in response to the instruction or request to generate a digital volumetric representation of the region. The guidance instructions provide guidance to the patient about obtaining a plurality of images of the region of the patient, and are based on the received instruction or request. The instructions can include information specific to the patient, the identified region of the patient, the device with which the images will be obtained, and/or a wide variety of other variables. The guidance instructions can comprise instructions on how to obtain a plurality of images of the region of the patient, including how many images to obtain, from which angles the images should be obtained, how far away from the region the camera should be positioned, lighting information, and/or a wide variety of other information. The guidance instructions can be provided to the patient via a user interface of the volumetric representation generation system. The guidance instructions can be provided to the patient via text, via icons and imagery, via sound, and/or via a variety of other mechanisms. Thus, a user interface may include one or more devices for enabling communication with a user. The user interface can be any device or system that allows information to be conveyed and/or received, and may include a display, a mouse, and/or a keyboard for receiving user commands.

According to an embodiment, the volumetric representation learning algorithm 264 is utilized to train the volumetric representation model 265. For example, the volumetric representation learning algorithm 264 can utilize the training dataset 262 to train the volumetric representation model 265. The algorithm of the volumetric representation generation system can be any machine learning algorithm, neural network, or other algorithm capable of utilizing the described input to generate the described output, thereby training the model. The algorithm of the volumetric representation generation system generates, using the plurality of received images as input, a continuous digital volumetric representation of the region. The algorithm of the volumetric representation generation system also generates, using the plurality of received images as input, a confidence level for the generated continuous digital volumetric representation of the region. Thus, the volumetric representation learning algorithm 264 trains the volumetric representation model 265 to similarly generate, using received images as input, a continuous digital volumetric representation of the region, and optionally a confidence level for the generated continuous digital volumetric representation of the region.

According to an embodiment, the trained volumetric representation model 265 processes a received plurality of images to generate a continuous digital volumetric representation of the region. The trained volumetric representation model 265 can also generate a confidence level for the generated continuous digital volumetric representation of the region, using the same input. The trained model of the volumetric representation generation system generates, using the plurality of received images as input, a continuous digital volumetric representation of the region. The trained model of the volumetric representation generation system also optionally generates, using the plurality of received images as input, a confidence level for the generated continuous digital volumetric representation of the region.

According to an embodiment, reporting instructions 266 direct the system to provide the generated continuous digital volumetric representation of the region and optionally the generated confidence level to a viewer such as the patient or a medical professional, among other possible viewers. The reporting instructions 266 may also direct the system to provide other information as well, including but not limited to the identity of the patient, patient demographics, diagnosis or treatment information, and a wide variety of other possible information. The information can be provided via the user interface using any method for conveying or displaying information, and the user interface can be any device, interface, or mechanism for providing the conveyed or displayed information. According to an embodiment, the instructions may direct the system to display the information on the user interface or display of the system. The information may be communicated by wired and/or wireless communication to another device. For example, the system may communicate the report to a mobile phone, computer, laptop, wearable device, and/or any other device configured to allow display and/or other communication of the information.

According to an embodiment, the volumetric representation generation system is configured to process many thousands or millions of datapoints in the input data used to train the volumetric representation model, as well as to process and analyze the extracted plurality of features. For example, generating a functional and trained volumetric representation model using an automated process such as feature identification and extraction and subsequent training requires processing of millions of datapoints from input data and the generated features. This can require millions or billions of calculations to generate a novel trained model from those millions of datapoints and millions or billions of calculations. As a result, each trained volumetric representation model is novel and distinct based on the input data and parameters of the machine learning algorithm and the model, and thus improves the functioning of the volumetric representation generation system. Thus, generating a functional and trained volumetric representation model comprises a process with a volume of calculation and analysis that a human brain cannot accomplish in a lifetime, or multiple lifetimes.

In addition, the volumetric representation generation system can be configured to continually receive new input data, perform longitudinal processing or analysis, and provide periodic or continual updates via the information provided to a user for the patient. This requires the analysis of thousands or millions of datapoints on a continual basis to optimize the reporting, requiring a volume of calculation and analysis that a human brain cannot accomplish in a lifetime.

By providing improved tele-imaging of a patient, this novel volumetric representation generation system has the potential for significant impact on patient care compared to prior art systems. As just one example in a clinical setting, by providing a system that can improve patient analysis and diagnosis—including with confidence intervals, the system can facilitate treatment decisions and improve survival outcomes, thereby leading to saved lives and improved quality of life.

The present invention may be a system, a method, and/or a computer program product. The computer program product may include a non-transitory computer readable storage medium (or media) having computer readable program instructions thereon for causing a system or processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any combination of the foregoing, among other possibilities. Computer readable program instructions described herein can be downloaded to respective computing/processing devices from a computer readable storage medium or to an external computer or external storage device via a network, for example, the internet, a local area network, and/or a wireless network. Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for generating a continuous digital volumetric representation of a region of a patient, comprising:
receiving by a volumetric representation generation system, an instruction or request to generate a digital volumetric representation of the region of the patient;
providing, to the patient via a user interface, one or more guidance instructions regarding obtaining a plurality of images of the region of the patient;
receiving a plurality of images obtained of the region of the patient, wherein at least of each of two or more of the plurality of images are obtained of the region of the patient from a different angle;
processing using a trained model, the received plurality of images to generate a continuous digital volumetric representation of the region;
providing the generated continuous digital volumetric representation of the region to a user;
processing one or more generated continuous digital volumetric representations of the region, the one or more generated continuous digital volumetric representations of the region generated from a plurality of images of the region of the patient obtained at one or more different times; and
computing, based on the one or more generated continuous digital volumetric representations of the region, one or more clinically-relevant metrics and/or risks.

2. The method of claim 1, wherein the trained model is further configured to generate, by processing the received plurality of images, a confidence level for the generated continuous digital volumetric representation of the region.

3. The method of claim 1, further comprising the steps of:
providing, to the patient via the user interface, an instruction to obtain one or more images of the region of the patient, wherein the instruction is based on the generated continuous digital volumetric representation of the region;
receiving one or more images of the region of the patient; and re-processing, using the trained model, the received plurality of images and the received one or more images to generate an updated continuous digital volumetric representation of the region.

4. The method of claim 1, wherein the plurality of images obtained of the region of the patient are obtained using a digital camera.

5. The method of claim 4, wherein the digital camera is a component of a wearable device or a smartphone of the patient.

6. The method of claim 1, further comprising training the model to process a received plurality of images of a region to generate at least a continuous digital volumetric representation of the region.

7. A method, comprising:
receiving a generated continuous digital volumetric representation of a region of a patient, wherein the continuous digital volumetric representation of the region of the patient is generated by the process:
receiving, by the system, an instruction or request to generate a digital volumetric representation of the region of the patient;
providing to the patient via a user interface, one or more guidance instructions regarding obtaining a plurality of images of the region of the patient;
receiving a plurality of images obtained of the region of the patient, wherein at least of each of two or more of the plurality of images are obtained of the region of the patient from a different angle;
processing, using a trained model, the received plurality of images to generate the continuous digital volumetric representation of the region; and
manipulating, using a visualization controller and user interface, the received continuous digital volumetric representation, wherein manipulation comprises at least viewing the received continuous digital volumetric representation from two or more different angles; and
processing one or more generated continuous digital volumetric representations of the region; and
computing, based on the one or more generated continuous digital volumetric representations of the region, one or more clinically-relevant metrics and/or risks.

8. The method of claim 7, wherein the plurality of images obtained of the region of the patient are obtained using a digital camera.

9. The method of claim 8, wherein the digital camera is a component of a wearable device or a smartphone of the patient.

10. The system of claim 9, wherein the processor is further configured to train the volumetric representation model to process a received plurality of images of a region to generate at least a continuous digital volumetric representation of the region.

11. A system for generating a continuous digital volumetric representation of a region of a patient, comprising:
a plurality of images obtained of a region of a patient, wherein at least of each of two or more of the plurality of images are obtained of the region of the patient from a different angle;
a trained volumetric representation model;
a processor configured to analyze, using the trained volumetric representation model, the received plurality of images to generate a continuous digital volumetric representation of the region;
a user interface configured to provide the generated continuous digital volumetric representation of the region to a user, wherein the processor is further configured to process the one or more generated continuous digital volumetric representations of the region, the one or more generated continuous digital volumetric representations of the region generated from a plurality of images of the region of the patient obtained at one or more different times, and compute, based on the one or more generated continuous digital volumetric representations of the region, one or more clinically-relevant metrics and/or risks.

12. The system of claim 11, wherein the processor is further configured to receive an instruction or request to generate a digital volumetric representation of the region of the patient, and wherein the user interface is further configured to provide one or more guidance instructions regarding obtaining a plurality of images of the region of the patient.

13. The system of claim 11, wherein the processor is further configured to: (i) provide an instruction to obtain one or more images of the region of the patient, wherein the instruction is based on the generated continuous digital volumetric representation of the region; (ii) receive one or more images of the region of the patient; and (iii) re-process, using the trained volumetric representation model, the received plurality of images and the received one or more images to generate an updated continuous digital volumetric representation of the region.

14. The system of claim 11, wherein the plurality of images obtained of the region of the patient are obtained using a digital camera.

15. The system of claim 14, wherein the digital camera is a component of a wearable device or a smartphone of the patient.

\* \* \* \* \*